United States Patent [19]
Oliver

[11] Patent Number: 5,492,359
[45] Date of Patent: Feb. 20, 1996

[54] PERSONAL MANUALLY-ACTUATABLE SAFETY RESTRAINT GAS BAG SHIELD

[76] Inventor: Robert S. Oliver, Maple Park, R.R. #2, Innerkip, Ontario, Canada, N0J 1M0

[21] Appl. No.: 265,958

[22] Filed: Jun. 27, 1994

[51] Int. Cl.⁶ ..................................................... B60R 21/16
[52] U.S. Cl. .................................. 280/728.1; 280/730.1; 446/220
[58] Field of Search ........................... 280/801.1, 728 R, 280/730 R, 733, 748, 750, 728.1, 730.1; 446/220, 226

[56] References Cited

U.S. PATENT DOCUMENTS

| 2,698,496 | 1/1955 | Miller | 446/226 |
|---|---|---|---|
| 4,111,457 | 9/1978 | Kob et al. | 280/728.1 |
| 4,265,468 | 5/1981 | Suszko et al. | 280/729 |
| 4,290,627 | 9/1981 | Cumming et al. | 280/729 |
| 4,474,390 | 10/1984 | Scholz et al. | 280/730.1 |
| 4,556,236 | 12/1985 | Scholz et al. | 280/729 |
| 4,834,420 | 5/1989 | Sankrithi et al. | 280/728.1 |
| 4,946,191 | 8/1990 | Putsch | 280/730.1 |
| 4,984,821 | 1/1991 | Kim et al. | 280/728.1 |
| 5,033,771 | 7/1991 | Miyauchi et al. | 280/728.1 |
| 5,049,106 | 9/1991 | Kim et al. | 446/220 |
| 5,083,771 | 1/1992 | Tyner | 446/220 |
| 5,174,599 | 12/1992 | Hull et al. | 280/750 |
| 5,178,408 | 1/1993 | Barrenscheen et al. | 280/728.1 |
| 5,213,361 | 5/1993 | Satoh et al. | 280/730.1 |

Primary Examiner—Kenneth R. Rice
Attorney, Agent, or Firm—Ezra Sutton

[57] ABSTRACT

A portable, personal, manually-activated safety restraining gas bag shield is provided herein. It includes a bag formed solely of gas-impermeable non-expandable fabric which is adapted to be selectively provided either in a deflated condition or in an inflated condition. A pocket in the bag having access means to the interior of the bag and controlled by a manually-actuatable, one-way valve to provide for gas to the interior of the bag. A cylinder of compressed gas is disposed within the pocket the cylinder including a closed nozzle connected to the manually-controlled, one-way valve for inflating the bag. Manually actuatable structure is provided to operate the manually-actuatable valve, thereby to control the flow of gas released from the cylinder into the interior of the bag.

10 Claims, 5 Drawing Sheets

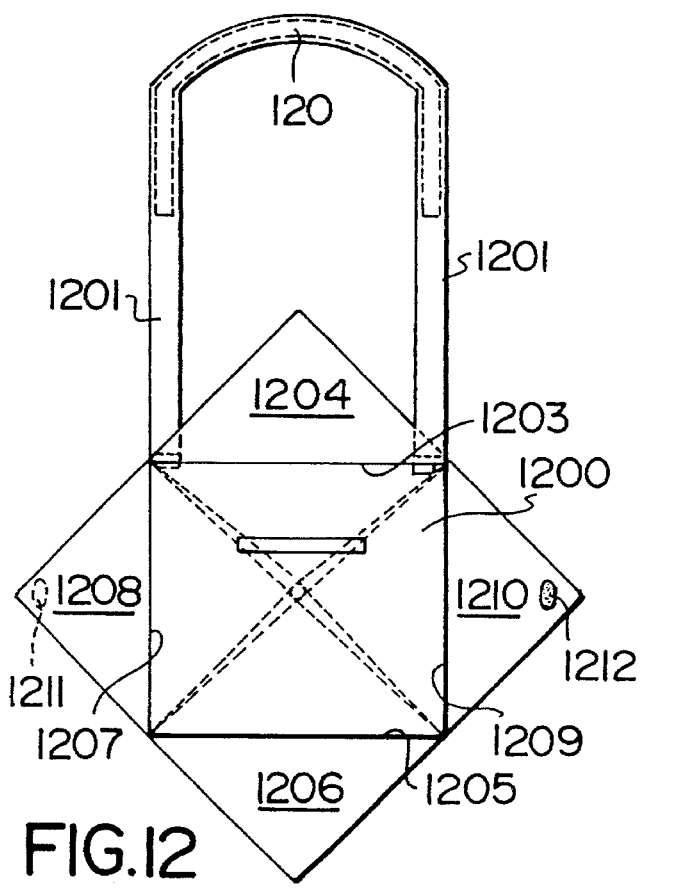
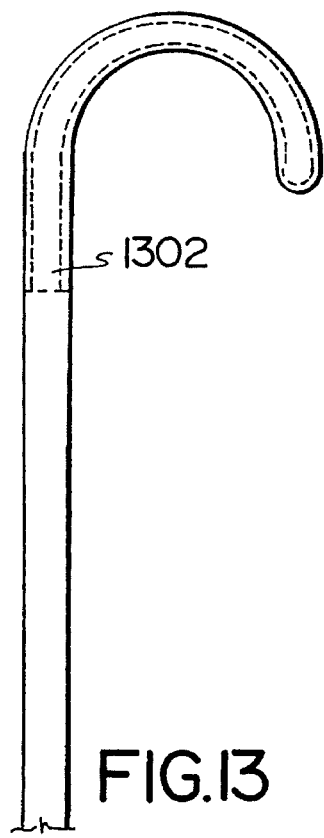
FIG.12
FIG.13
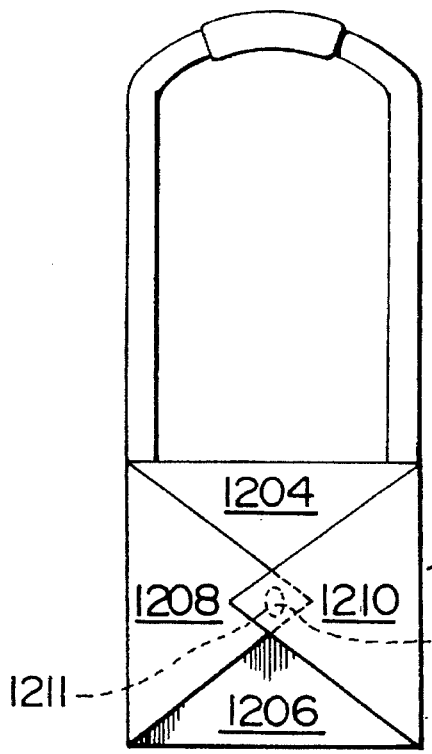
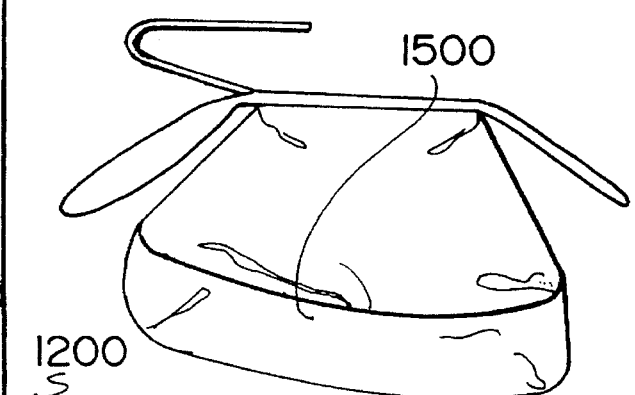
FIG.14
FIG.15

PERSONAL MANUALLY-ACTUATABLE SAFETY RESTRAINT GAS BAG SHIELD

BACKGROUND OF THE INVENTION

1. Field of the Invention

This invention relates to a personal manually-actuatable or activated safety restraint air bag shield.

2. Description of the Prior Art

Inflatable restraining devices are well known for motor vehicles, but most of such devices are actually secured to such motor vehicle, and are automatically activated. Among those patents are the following: U.S. Pat. No. 4,111,457 patented Sep. 5, 1971 by A. Kob et al; U.S. Pat. No. 4,265,468 patented May 5, 1981 by D. H. Suszko et al; U.S. Pat. No. 4,290,627 patented Sep. 22, 1981 by R. J. Cumming et al; U.S. Pat. No. 4,474,390 patented Oct. 2, 1984 by H. Scholz et al; U.S. Pat. No. 4,556,236 patented Dec. 3, 1985 by H. J. Scholz et al; U.S. Pat. No. 5,033,771 patented Jul. 23, 1991 by F. Miyauchi et al; U.S. Pat. No. 5,178,408 patented Jan. 12, 1993 by F. Barrenscheen et al; and U.S. Pat. No. 5,213,361 patented May 25, 1993 by T. Satoh et al.

It will thus be observed that most of the air bag restraint systems are fixed to a motor vehicle, or are adapted to be fixed to a motor vehicle. One exception is U.S. Pat. No. 4,834,420 patented May 30, 1989 by V. M. Sankrithi et al, which provided an air bag equipped, child accommodating deployable air bag. The air bag included accident-sensing means and air bag inflation means. Forward, rearward, and sideward orientations of the child accommodating device were said to be possible, relative to the vehicle.

The objects of that patent, however were different from the objects of the present invention. Those objects were to provide a child accommodating device for a vehicle having the following characteristics: safe and comfortable accommodation for a child, while providing increased mobility of the child accommodated in non-accident conditions; automatical reconfiguration to restrain and protect the child within the device, in accident conditions; and automatical deployment of the air bag to protect a child in the event of a serious accident involving the vehicle.

Another exception was U.S. Pat. No. 4,946,191 patented Aug. 7, 1990 by P-U Putsch which provided a motor vehicle seat with a back rest and air bag assembly combined with a vehicle seat, for supporting a vehicle user. It included a back rest, a head rest, an area supporting the shoulders of the user, and having at least one forwardly projecting side wing in the area supporting the shoulders of the seat user, the side wing having an upper surface. The side wing included at least one recess positioned in the upper surface, in which an inflatable air bag was located. The air bag, in the inflated condition, formed a support laterally adjacent the head of the seat user. The air bag was housed in a recess provided in the extended wing or side portion of the seat when not inflated, so as to be hidden from view.

The principal object of that invention was different from the objects of the present invention, namely to create a vehicle seat that provided increased protection to the user from forces acting laterally to the vehicle in an accident, without inhibiting the necessary freedom of movement and vision of the user. Another object of that invention was to provide a vehicle seat having a back rest which includes an air bag for supporting the upper portion of the user's torso.

Yet another exception was U.S. Pat. No. 4,984,821 patented Jan. 15, 1991 by S. N. Kim et al, which provided a gas expansion type shock absorbing safety cloth for motorcycle drivers. The cloth included a shock absorbing tube, a gas regulator connected through gas conduits to the shock absorbing tube, and compressed gas storage and discharge devices connected to the gas regulator. An ignition controller included a trigger device connected through an electric wire and a pull string to the ignition controller. A connector was disposed intermediate between both the electric wire and the pull string in such a manner that it was separated upon applying of a pulling force exceeding a certain predetermined value. The connector was disposed between the trigger device and the gas storage and discharge device, thereby making it possible to pack the various components of the system into a small bag for carrying conveniently.

SUMMARY OF THE INVENTION

Aims of the Invention

In a radical departure from the objects of the inventions in the above-identified patents, it is an object of the present invention to provide a device for a vehicle which is portable, but which may be easily associated with the vehicle and likewise be easily removed from the vehicle.

Another object of the present invention is to provide a personal, manually-actuated, safety restraint gas bag shield.

Statement of Invention

This invention provides a portable, personal, manually-activated safety restraint gas bag comprising: a bag formed solely of gas-impermeable, non-expandable fabric, and adapted to be selectively provided either in a deflated condition or in an inflated condition; (ii) a pocket in the bag having access means to the interior of the bag, and controlled by a manually-actuatable, one-way valve to provide for gas access to the interior of the bag; (iii) a cylinder of compressed gas disposed within the pocket, the cylinder including a closed nozzle connected to the manually-controlled one-way valve, and being actuatable manually for inflating the bag; and (iv) manually-actuatable means to operate the manually-actuatable valve, thereby to control the flow of gas released from the cylinder into the interior of the bag.

Other Features of the Invention

Preferably, the bag has two spaced-apart planar surfaces.

In another feature, the bag includes a pocket secured on the exterior of one planar surface, the pocket covering a closable opening in that planar surface.

In yet another feature, means are provided on one planar surface temporarily to secure the bag to a base member.

In yet another feature the source of gas under pressure is a cylinder of compressed gas, e.g., air, $CO_2$ or $N_2$, having outlet means to supply gas to the interior of the bag. Preferably the cylinder includes a valve associated with the outlet means to control the supply of gas to the interior of the bag. Still further the cylinder includes a threaded outlet neck and an internally threaded nipple secured to the gas inlet means to the bag, the nipple including the valve means. In a still further feature, the means to control the flow of gas into the bag may be a hand-squeezable bulb to operate the valve. In yet another feature, the means to control the flow of gas into the bag may include a pivotal hand lever to operate the valve.

By still another feature, the bag includes a carrying handle, and four flaps by means of which the bag may be folded into a compact condition.

Generalized Description of the Invention

In more general terms, by the present invention, a safety gas bag is provided which folds and is stored inside a storage carry bag. A semi-rigid strap is provided thereon which can be bent to hang over a seat, etc., to make the safety gas bag ready to be deployed. The safety gas bag includes an inflation bulb, whereby a squeeze on the bulb will release the compressed gas from a compressed gas cylinder and instantly blow up the gas bag and thereby shielding the person from injury. The safety gas bag includes air escape holes, each covered with light paper diaphragm which will break under pressure to release gas and to deflate the safety gas bag.

According to one embodiment of this invention, the bag may be made of "RIPSTOPT™" fabric, 125–200 thread count (Denier) with a further thread running crisscross in the material.

Alternatively, the bag may be made of a plain-weave woven fabric of synthetic threads, the woven fabric having a set of 16 to 23 threads per cm, its threads having a denier of d470 dtex. Inflation of the gas bag results in expansion of the bag. The bag may have a polymer urethane coating and/or a metallized aluminum coating.

In another alternative embodiment of this invention, the bag may consist of a woven fabric which is made of synthetic threads and which has an overcrowded fabric construction. It may be made of a woven fabric which has been shrunk, and heat-set and calendered. The woven fabric could have a plain weave with 34 warp threads and 16 picks per cm and the warp and weft consist of threads having a denier of dtex 470. As a result of shrinking, heat-setting and calendering treatments, the woven fabric is overcrowded, i.e., it has been condensed to such a degree that it is virtually impermeable to gas so that there is no need to provide a coating on the inside surface of the woven fabric.

Since the bag is made up of non-expandable cloth as a whole, the surface facing the human body and projecting portions on both sides thereof are inflated evenly when it is inflated.

It is preferred that the inflation of the bag be by means of compressed air, compressed carbon dioxide or compressed nitrogen gas. This is preferably provided by a suitable gas-filled cartridge. A source of compressed $CO_2$, compressed air or compressed $N_2$ is preferred since these gases are compatible with humans, are non-flammable, non-explosive and innocuous. Moreover, they are easily obtained and are easily compressible into a compressed gas cylinder to be disposed within the pocket for inflating the bag. The gas-filled cartridge may be of a typical size of 15 g, 25 g, 50 g, or 75 g or even larger, with a threaded screw neck to provide replaceable cartridges.

BRIEF DESCRIPTION OF THE DRAWINGS

In the accompanying drawings,

FIG. 12 is a front view of a gas bag of another embodiment of this invention, in the shape of a foldable gas bag with handles;

FIG. 13 is a front view of a modified handle for the bag of FIG. 12;

FIG. 14 is a plan view of the foldable gas bag of FIG. 12 in its folded condition;

FIG. 15 is a view of another folded-up bag of another embodiment of this invention;

DESCRIPTION OF THE PREFERRED EMBODIMENTS

Figure 1:
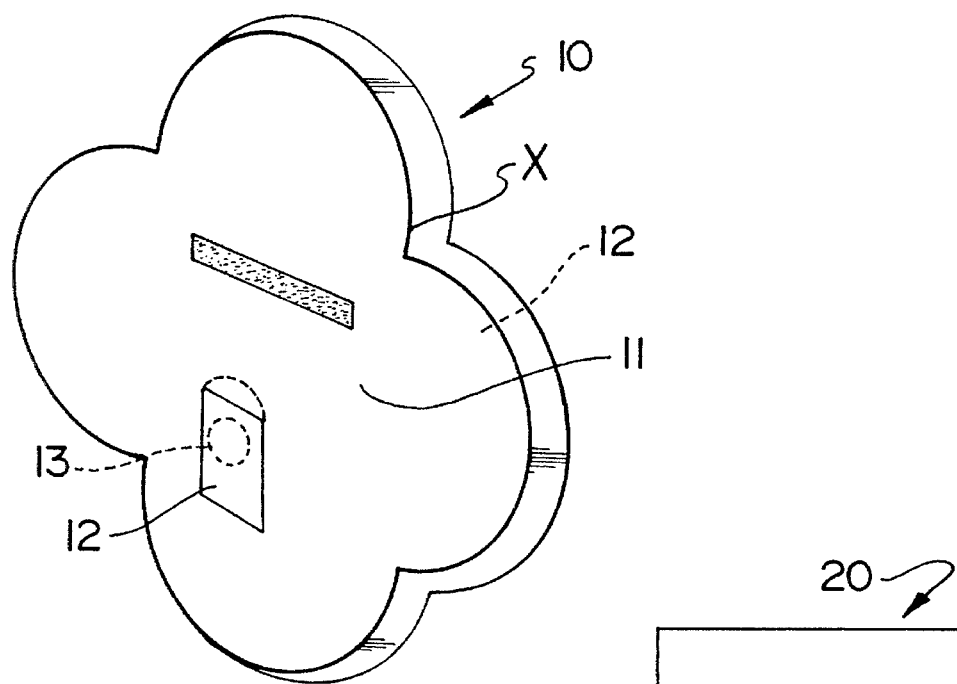
FIG. 1 is a front view of one gas bag according to an embodiment of the invention.
Figure 2:
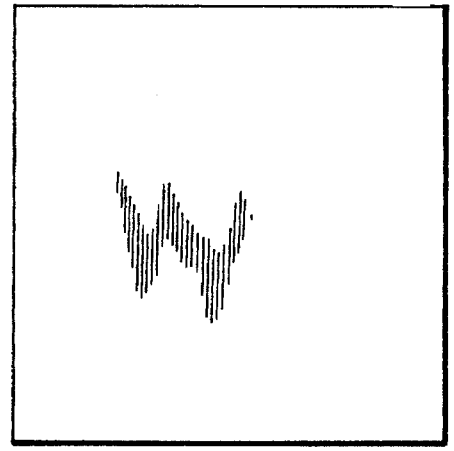
FIG. 2 is a front view of a gas bag of another embodiment of this invention, in the form of a square-shaped bag.
Figure 3:
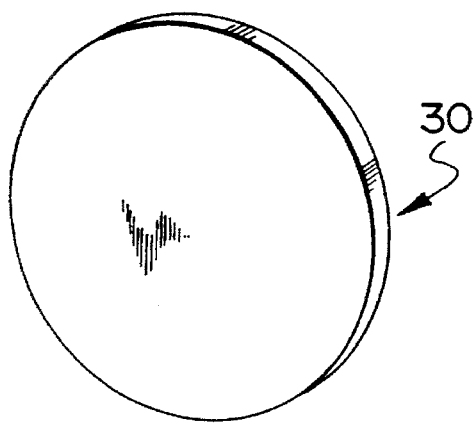
FIG. 3 is a front view of a gas bag of another embodiment of this invention, in the form of a round pillow-shaped bag.
Figure 4:
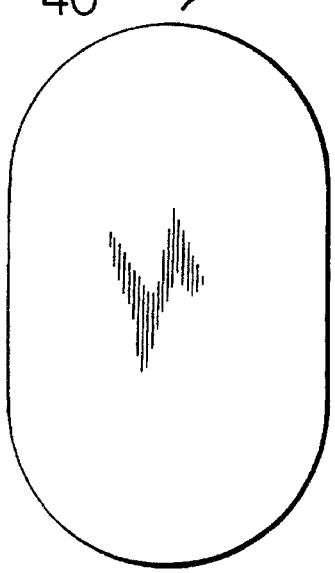
FIG. 4 is a front view of a gas bag of another embodiment of this invention, in the form of a "race-track"-shaped bag.
Figure 5:
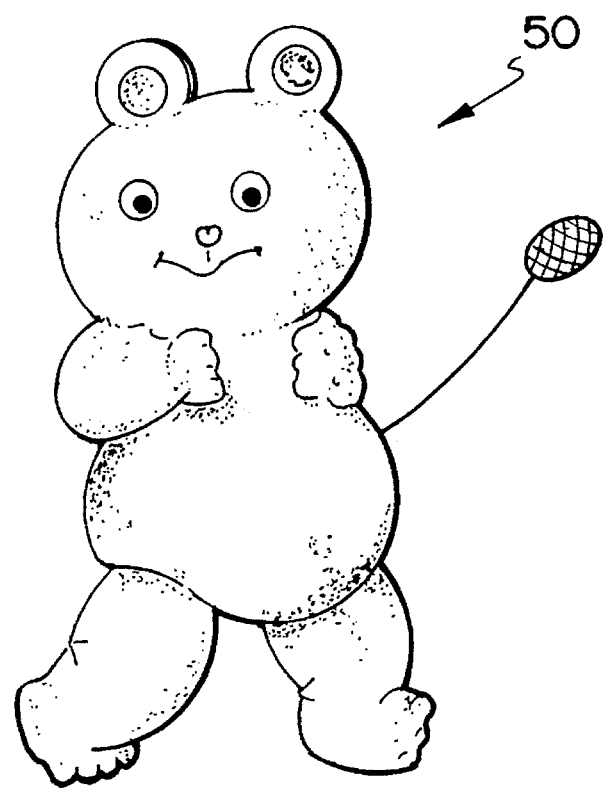
FIG. 5 is a front view of a gas bag of another embodiment of this invention, in the form of a safety "teddy bear" which may be stuffed.

Description of FIG. 1

As seen in FIG. 1, the bag 10 of the present invention is planar and has a front face 11 and a rear face 12 to provide a bag which is at least 6" thick as represented by "X". The bag 10 includes a pocket 12 therein for the insertion of the activatable inflation device, e.g., a $CO_2$ cylinder, therein with a hole 13 in the front face 11 of the bag 10. A horizontal strip 14 of VELCRO™ is provided on the front face 11.

Description of FIGS. 2–5

The bag 10 shown in FIG. 1 may be of any shape. Thus, in FIG. 2, the bag 20 is square; in FIG. 3 the bag 30 is round; in FIG. 4 the bag 40 is race-track in shape; and in FIG. 5 the bag 50 is of "teddy-bear" shape. Thus, the air bag of this invention can be of any shape and size, and be provided in all colours, and may be bright or fluorescent. It is thus of a type which one may carry anywhere, whether the person is a bus passenger, a train passenger, a taxi passenger, an automobile passenger, or an aircraft passenger.

Figure 6:
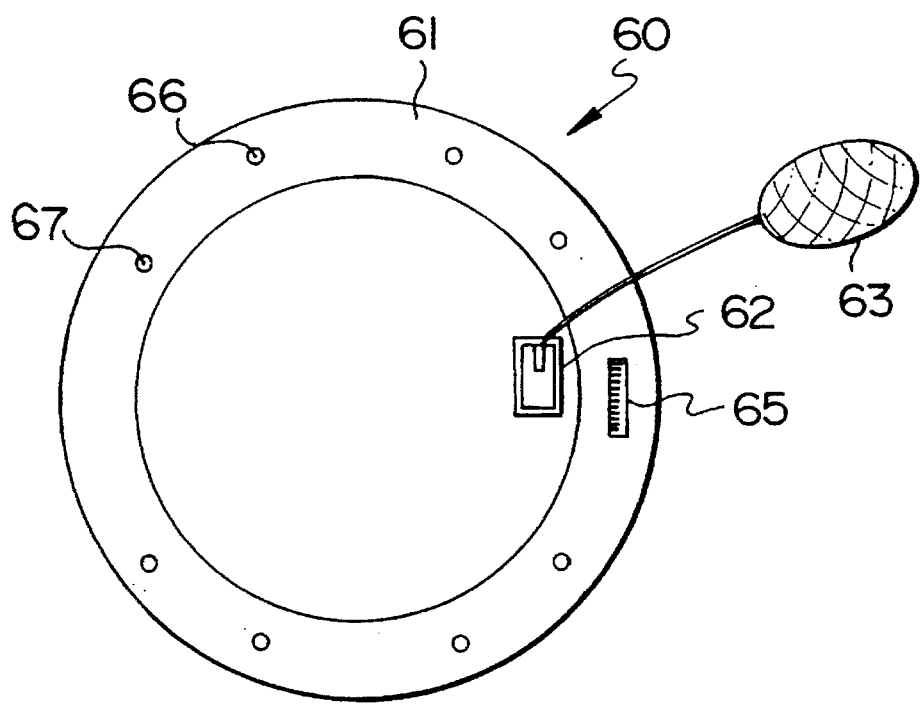
FIG. 6 is a front view of a gas bag of another embodiment of this invention, in the form of a round-shaped gas bag.

Description of FIG. 6

FIG. 6 shows a round air bag 60 provided with a compressed gas cylinder 61 in the pocket 62 (see 12 in FIG. 1). The compressed gas cylinder 61 is operated by an activating bulb 63. A ZIPPER™ 65 is provided along with plurality of gas escape holes 66 covered with light-weight paper diaphragms 67, which will break under pressure to release the gas and thereby deflate to the bag 60.

Figure 7:
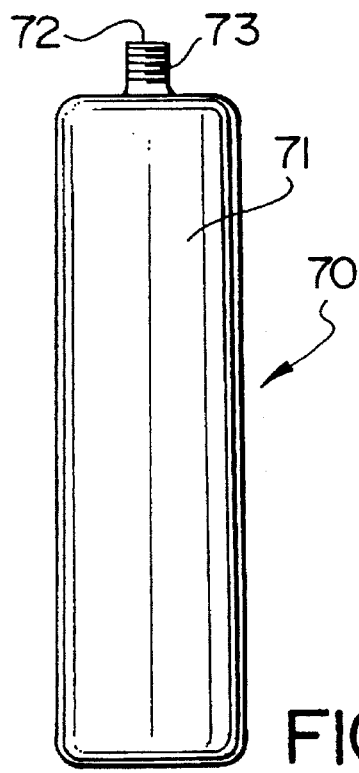
FIG. 7 is a view of a typical inflating cylinder.

Description of FIG. 7

FIG. 7 shows a typical inflating gas cylinder 70, i.e., a compressed air, compressed $CO_2$, or compressed $N_2$ cartridge 71, which may be of 15 g, 25 g, 50 g, 75 g or even larger typical size. It is provided with a screw neck 72 having threads 73 and is thus a replaceable cartridge 71.

Description of FIGS. 8–11

Figure 8:
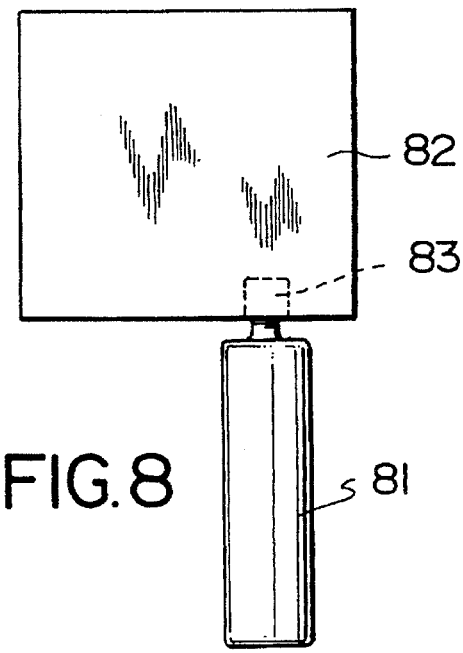
FIG. 8 is a view of one way of securing a typical inflating cylinder to a bag of one embodiment of the invention.

FIGS. 8 to 11 show typical trigger devices associated with the bag. In FIG. 8, the square trigger device 82 is provided with a compressed air, compressed $CO_2$, or compressed $N_2$ cartridge 81 having a valve 83. The valve 83 is manually or automatically activated.

Figure 9:
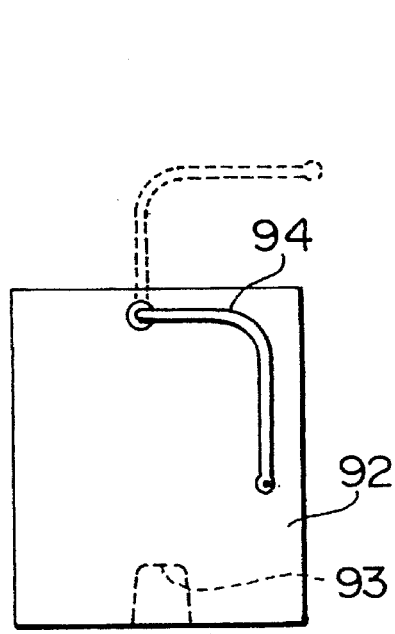
FIGS. 9, 10 and 11 are views showing typical trigger devices.

Description of FIG. 9

In FIG. 9, the square trigger device 92 is provided with a pull trigger 94 which operates a valve similar to valve 83 in FIG. 8.

Figure 10:
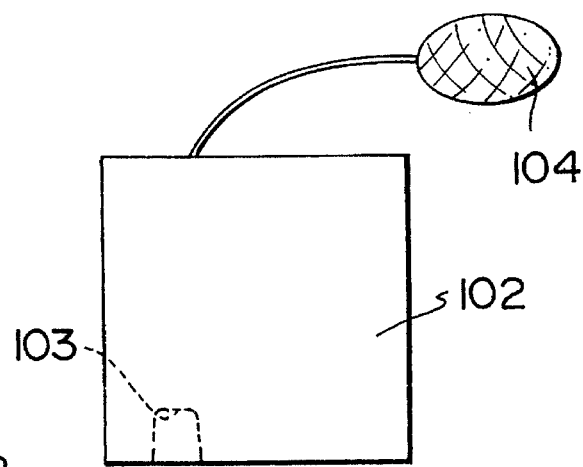

Description of FIG. 10

In FIG. 10, the square trigger device 102 is provided with a squeeze bulb-trigger 104 to operate valve 103.

Figure 11:
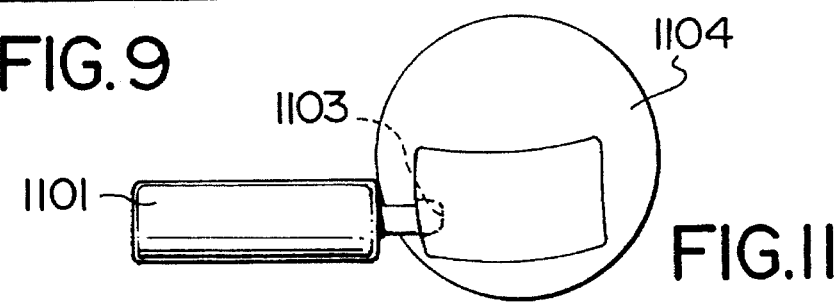

Description of FIG. 11

FIG. 11 shows a 2" diameter circular trigger device 1104 associated with a $CO_2$, compressed air or $N_2$ cartridge 1101 having a valve 1103 similar to valve 83 in FIG. 8.

Description of FIGS. 12–14

FIGS. 12 to 14 show a foldable air bag 1200 which is provided with a foldable carrying strap 1201, fitted with either "U-shaped" strap 1202 (FIG. 12) or "cane-shaped" strap 1302 (FIG. 13). It is noted that the folding is facilitated and maintained by means of VELCRO™ patches to be described further.

The bag 1200 includes a first fold line 1203, to provide a first triangular flap 1204, a second fold line 1205 to provide a second triangular flap 1206, a third fold line 1207 to provide a third flap 1208 and a fourth fold line 1209 to provide a fourth flap 1210. The third flap 1208 is provided with one-half of a VELCRO™ strip 1211 on its reverse face, while the fourth flap 1210 is provided with one-half of a VELCRO™ strip 1212 on its front face.

In folding, the first flap 1204 is folded down and the second flap 1206 is folded to overlap the first flap 1204 near the apices thereof. The third flap 1208 is then folded atop the first flap 1204 and second flap 1206, and the fourth flap 1210, is folded atop the third flap 1208. The VELCRO™ strip 1212 is secured to the VELCRO™ strip 1211.

The folded-up version of the bag 1200 is shown in FIG. 14.

Another form of folded-up bag 1500 in the form of a knapsack-type bag is shown in FIG. 15.

Figure 16:
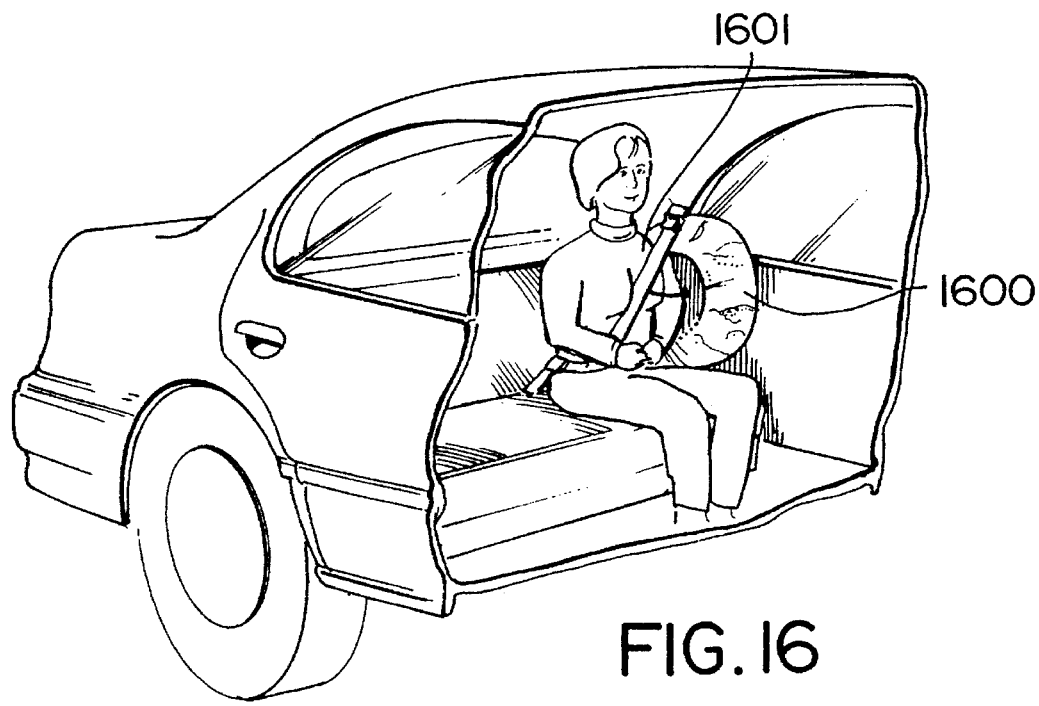
FIG. 16 is a view of one use of the gas bag of this invention.
Figure 17:
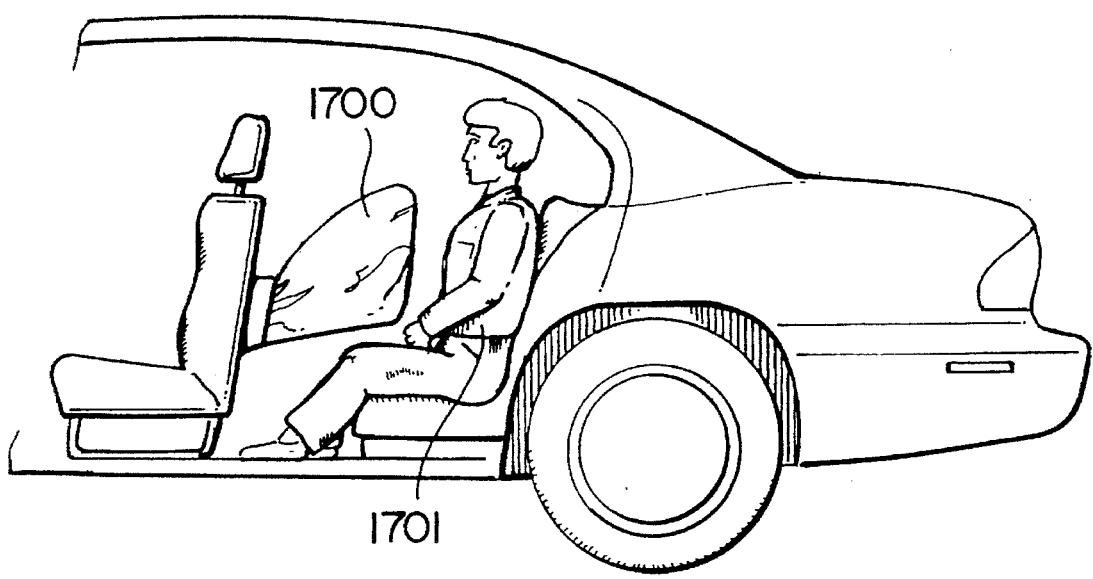
FIG. 17 is a view of another use of the gas bag of this invention.

Description of FIGS. 16 and 17

FIG. 16 shows how an air bag 1600 may be positioned to protect a passenger 1601 from side impact, while FIG. 17 shows how an air bag 1700 may be positioned to protect a rear passenger 1701 from front impact.

COLNCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A portable, personal, manually-activated safety restraining gas bag shield comprising:

(i) a bag formed solely of gas-impermeable, non-expandable fabric, and adapted to be selectively provided either in a deflated condition or in an inflated condition;

(ii) a pocket in said bag having access means to the interior of said bag, and controlled by a manually-actuatable, one-way valve to provide for gas access to the interior of said bag;

(iii) a cylinder of compressed gas disposed within said pocket, said cylinder including a closed nozzle connected to said manually-controlled, one-way valve and being actuatable manually for inflating the bag; and (iv) manually-actuatable means to operate said manually-actuatable valve, thereby to control the flow of gas released from said cylinder into the interior of said bag.

2. The bag of claim 1 which has two spaced-apart planar surfaces.

3. The bag of claim 2 wherein said pocket is secured to the exterior of one planar surface, said pocket covering a closable opening in that planar surface.

4. The bag of claim 2 including means on one planar surface temporarily to secure said bag to a base member.

5. The bag of claim 2 wherein the source of gas under pressure is a cylinder of compressed air, compressed carbon dioxide, or compressed nitrogen, having controllable outlet means to supply gas to the interior of said bag.

6. The bag of claim 5 including a valve associated with said outlet means to control the supply of gas to said interior of said bag.

7. The bag of claim 6 including a threaded outlet neck on said cylinder, and an internally threaded nipple secured to said gas inlet means to said bag, said nipple including said valve means.

8. The bag of claim 7 wherein said manual means to initiate control of the flow of gas into said bag comprises a hand squeezable bulb to operate the valve.

9. The bag of claim 7 wherein said manual means to initiate control of the flow of gas into said bag includes a pivotal hand lever to operate the valve.

10. The bag of claim 1 including a carrying handle, and four flaps by means of which said bag may be folded into a compact condition.

\* \* \* \* \*